No. 790,859. PATENTED MAY 23, 1905.
A. R. WARD.
REMOVABLE HORSESHOE.
APPLICATION FILED MAR. 29, 1905.
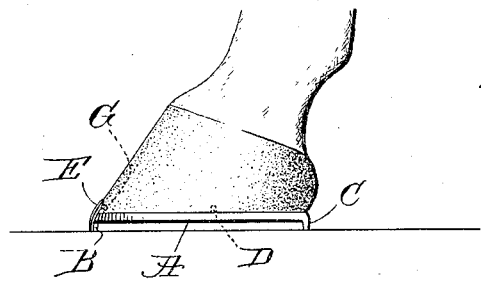
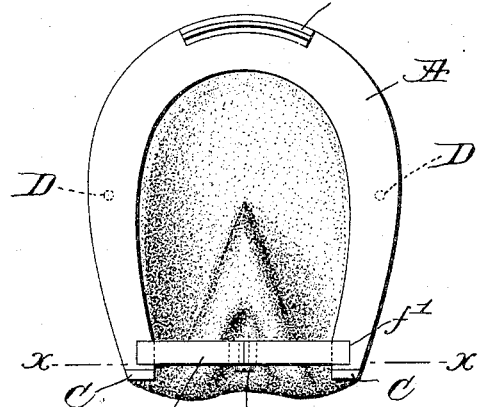
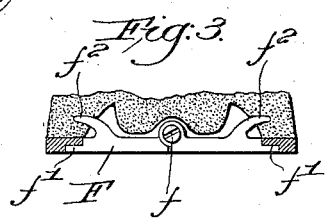
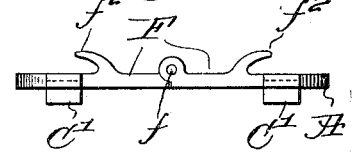
Witnesses,
Edward F. Allen
Thomas J. Drummond
Inventor,
Allard R. Ward,
by Crosby & Gregory
attys No. 790,859.                                                              Patented May 23, 1905.

UNITED STATES PATENT OFFICE.

ALLAND R. WARD, OF INTERVALE, NEW HAMPSHIRE.

REMOVABLE HORSESHOE.

SPECIFICATION forming part of Letters Patent No. 790,859, dated May 23, 1905.

Application filed March 29, 1905. Serial No. 252,630.

*To all whom it may concern:*

Be it known that I, ALLAND R. WARD, a citizen of the United States, residing at Intervale, county of Carroll, State of New Hampshire, have invented an Improvement in Removable Horseshoes, of which the following description, in connection with the accompanying drawings, is a specification, like letters on the drawings representing like parts.

This invention relates to a horseshoe which can be readily and quickly attached to and removed from the hoof of a horse or other animal adapted to wear such a device. Notwithstanding that prior attempts have been made to devise such a removable shoe, horses are still universally shod in the usual manner by nailing the shoe to the hoof.

Frequent removal of a shoe nailed to the hoof, as is of course necessary by the wearing out of the shoe, refitting the same with calks, the changing of the weight of the shoe, &c., not only seriously injures the holding power of the hoof through the enlarging, multiplying, or splitting of the nail-holes, but also frequently results in injury to the sensitive part of the foot. Neither can the shoe be allowed to remain on the hoof a great length of time, because the shoe must conform exactly to the natural tread of the foot. The truncated cone of the hoof, which has its base downward, constantly increases in circumference, so that in time the shoe becomes too small and a source of pain to the horse and must be removed and replaced. When it is remembered that every time a horse is shod it implies damage to the foot and that the best and most expert shoeing of necessity inflicts some injury, the importance of this matter to the horse's owner is evident. Furthermore, when shoes are nailed or permanently fastened to the hoof it is necessary for the horse to wear the shoes not only on those places where they are necessary, as on hard and stony roads, but also in pasturage and in the stable. In winter when the ground is frozen and icy it is necessary to have the calks kept continually sharp; but with sharp calks the horse is frequently cutting its feet by stepping on them, and also cutting up the floor of the stable. The device of the present invention affords a remedy to all these difficulties and to all those difficulties which are attendant upon the use of permanently-fastened shoes. The present horseshoe has been found after actual test to remain firmly in place on the horse's hoof during conditions of hard usage and to be removable only when manually unlocked. With this horseshoe whenever it is desired to remove the shoe for repairs, the recalking, or changing the weight or size it can simply be unlocked from the hoof by a very simple operation and replaced in the same way. The shoe can be removed every time the horse is stabled and replaced when he is to be driven on the road. The horseshoe will also to be found to subserve the purposes of those devices known as "hoof-expanders," mechanical devices which are occasionally provided for counteracting the tendency of a horse's hoof to contract, and thus produce hoof diseases.

The precise nature of the invention will appear from the drawings and description.

In the drawings is shown the lower end of a horse's hoof provided with the horseshoe of this invention, and the construction is shown in detail with one modification thereof.

Figure 1 represents in side elevation the lower end of a horse's leg, showing the shoe in place thereon. Fig. 2 is a larger view of the parts shown in Fig. 1 looking at the hoof part from beneath. Fig. 3 is a cross-section taken on the line $x\,x$ of Fig. 2. Fig. 4 is a view in fragmentary detail of a modification of the device. Fig. 5 is an end elevation of the parts shown in Fig. 4.

The body of the shoe A is made of the usual horseshoe form and varies in exact shape, in weight, and in general construction according to the hoof of the horse and the condition of the work which is to be performed by the horse. This body portion of the shoe may be provided in the usual manner with a toe-calk B and with heel-calks C of any desired form. The shoe should also be provided with projections D D, herein shown as pins projecting in recesses formed in the hoof, but which may be of any common form. The purpose of these projections is to aid in maintaining the position of the shoe on the hoof, and in particular its position lengthwise of the hoof.

The means for clamping the shoe to the hoof consists in two features: first, an upwardly-extending rigid toe-clip E, which is formed to fit the toe of the hoof and to extend up over the toe of the hoof and grip it securely, and, second, in a hinged toggle-piece provided with obliquely-extending prongs near its ends and so arranged that it may be snapped into position with its ends resting on the heels of the shoe and its prongs entering the hard horny bars of the hoof. By this this means the shoe is locked firmly and tightly against the hoof and cannot be removed until the toggle is sprung open manually. The essential feature will thus be seen to lie in the connection of the shoe at the heel of the hoof. The toggle-piece, the preferred construction of which may be seen clearly in Fig. 3, consists of two parts F F, hinged together, the pintle of the hinge being shown at $f$. The ends of the toggle parts are arranged to overlap and butt against the heels of the shoe, and the preferable way in which this is secured is by forming recesses $f'$ $f'$ in each heel, in which the end of each toggle-piece is seated. The prongs by which the toggle holds the shoe to the hoof are shown at $f^2$ $f^2$. They must project from each toggle-piece near its end obliquely outward and transversely to the axis of the hinge and should be curved. Suitable holes are drilled in the hard horny bars of the hoof at the proper place near the ends for the reception of these prongs.

The hoof of the horse is properly prepared by trimming the edges and rasping it down to fit the shoe. The shoe is then placed in position with the toe-clip E fitting over the toe of the hoof and the projections D in hollows or holes provided for them. The toggle-piece with the hinge open is then placed in position with the prongs about to enter the holes in the hoof and with the ends of the toggle parts arranged to slip into their seats. The toggle is then snapped into place when the prongs will enter the holes in the hoof and bind the hoof tightly to the heel of the shoe. The hinge of the toggle springing below the plane of the shoe holds the parts locked in position and prevents removal until the toggle-hinge is sprung in the opposite direction, which may be done by prying it with a suitable instrument. By varying the length of the toggle parts or varying the length of the recesses in which they are seated the toggle-piece may be adjusted somewhat to expand the hoof more or less, as may be necessary.

So long as the toggle-piece comprises the end portions seated on the heels of the shoe and the outwardly obliquely projecting prongs seating in holes in the hoof-bars and serving to bind the shoe in place its construction may be modified for other purposes. For example, in Figs. 4 and 5 the toggle-piece is shown as extended and itself provided with calks C'. By this modification the calks can be changed as desired by a simple change of the toggle-piece without affecting the entire shoe.

The entire shoe will be found to solve completely the difficulties attendant upon the nailed horseshoe and to be exceedingly simple in its operation and durable in its construction.

Having described my invention, what I claim as new, and desire to secure by Letters Patent, is—

1. A horseshoe comprising a body portion of the usual form, a toe-clip at the toe end thereof adapted to catch the hoof, a two-part hinged toggle-piece provided with a prong near the outer end of each hinge part, said prong projecting obliquely outward and transversely to the axis of the hinge, the ends of the toggle parts being seated upon and abutting against the heels of the shoe, whereby when the toggle-piece is snapped in place the prongs will enter in divergent directions previously-prepared holes in the hoof-bars and lock the shoe firmly against the hoof.

2. A horseshoe comprising a body portion of the usual form, a toe-clip at the toe end thereof adapted to catch the hoof and with a recess at each heel end, a two-part hinged toggle-piece provided with a prong near the outer end of each hinge part, said prong projecting obliquely outward and transversely to the axis of the hinge, the ends of the toggle parts being seated in said recesses in the heels of the shoe, whereby when the toggle-piece is snapped in place the prongs will enter in divergent directions previously-prepared holes in the hoof-bars and lock the shoe firmly against the hoof.

3. A horseshoe comprising a body portion of the usual form, a toe-clip at the toe end thereof adapted to catch the hoof, a two-part hinged toggle-piece provided with a calk and with a prong near the outer end of each hinge part, said prong projecting obliquely outward and transversely to the axis of the hinge, the ends of the toggle parts being seated upon and abutting against the heels of the shoe, whereby when the toggle-piece is snapped in place the prongs will enter in divergent directions previously-prepared holes in the hoof-bars and lock the shoe firmly against the hoof.

4. A horseshoe comprising a body portion of the usual form, a toe-clip at the toe end thereof adapted to catch the hoof and with projections on the sides of the body portion adapted to fit corresponding recesses in the hoof, a two-part hinged toggle-piece provided with a prong near the outer end of each hinge part, said prong projecting obliquely outward and transversely to the axis of the hinge, the ends of the toggle parts being seated upon and abutting against the heels of the shoe, whereby when the toggle-piece is snapped in place the prongs will enter in divergent directions previously-prepared holes in the hoof-bars and lock the shoe firmly against the hoof.

5. A horseshoe comprising a body portion of the usual form, a clip adapted to catch the toe of the hoof, a laterally-expansible locking device provided with a prong near each end projecting obliquely outward, the said locking device when expanded having its ends seated upon and abutting against the heels of the shoe with the prongs entering in divergent directions previously-prepared holes in the hoof-bars, whereby the shoe is locked firmly on the hoof.

In testimony whereof I have signed my name to this specification in the presence of two subscribing witnesses.

ALLAND R. WARD.

Witnesses:
  W. H. DREW,
  FRED W. DINSMORE.